Sept. 15, 1959   W. GSCHEIDLEN   2,904,692
DEVICE FOR COLLIMATION OF A RAY BEAM
Filed Jan. 15, 1957   2 Sheets-Sheet 1

Inventor.
Wilhelm Gscheidlen.
By (signature) Atty

Sept. 15, 1959        W. GSCHEIDLEN        2,904,692
DEVICE FOR COLLIMATION OF A RAY BEAM
Filed Jan. 15, 1957        2 Sheets-Sheet 2

Inventor:
Wilhelm Gscheidlen.
By
Atty

United States Patent Office 2,904,692
Patented Sept. 15, 1959

2,904,692
DEVICE FOR COLLIMATION OF A RAY BEAM

Wilhelm Gscheidlen, Erlangen, Germany, assignor to Siemens-Reiniger-Werke Aktiengesellschaft, Erlangen, Germany, a firm Application January 15, 1957, Serial No. 634,195

Claims priority, application Germany January 21, 1956

6 Claims. (Cl. 250—105)

This invention relates to a device for collimation of a useful ray beam emanating from a source of high energy, for example, cobalt 60, employing collimator plates that can be adjusted perpendicular to the central ray of the ray beam to be collimated. The usual collimator systems of this kind provide rectangular plates, which are arranged in pairs one above the other and positioned in planes perpendicular to the central ray of the ray beam in such manner that subsequent pairs of plates in the direction of the central ray are at right angles to each other. This stacked arrangement of the pairs of plates in the direction of the central ray necessitates a rather large size of the collimator system. In the direction of the central ray, subsequently arranged pairs of plates which limit the ray beam at their opposing sides are not directly stacked one above the other but arranged with a space between them. This space is occupied by a pair of plates disposed at right angle to the adjacent pair of plates and therefore limits the beam with the other opposing sides. Furthermore, this arrangement allows only the collimation of rectangular or quadratic fields.

According to this invention a plurality of groups of collimator plates which are approximately rectangular are positioned upright in the direction of the central ray of the ray beam and stacked perpendicular to the central ray, an adjusting member being provided for each collimator plate, and a driving element, a driving shaft for instance, which is common to the adjusting members of a group is coupled thereto via friction couplings only. Thereby, the following advantages are obtained:

The ray beam is laterally limited by the edge walls of the upright collimator plates. These limiting surfaces are not interrupted in the direction of the central ray. Consequently, this collimator system can be less in height than the usual collimator systems where the lateral limiting surfaces are interrupted in the direction of the central ray.

Since the power transmission from the common driving element to the individual adjusting members of a group is effected only by friction, it is possible to apply counter forces to the individual collimator plates when the common driving element is actuated, which counteract the frictional force between the driving element and the adjusting member for the individual collimator plate.

Such counter forces may be produced, for example, by means of stops for the individual collimator plates. If such counter forces are not applied, all collimator plates will be moved when the driving element for the corresponding group of plates is actuated. Stops may be provided for individual plates, so as to exclude such plates from the common adjustment operation, either along the complete range of adjustment or a part thereof. It is in this manner possible to limit the useful ray beam so as to obtain desired shapes and sizes of fields.

The foregoing and further features and objects of the invention will appear from the following description of examples which will be rendered below with reference to the accompanying drawing. In the drawing, Fig. 1 shows a radiation head partly in section and partly in elevation;

Figure 9:
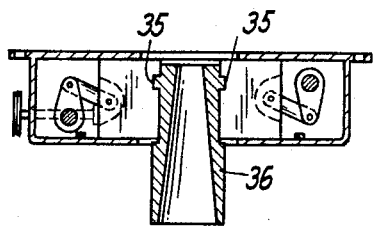
Figure 4:
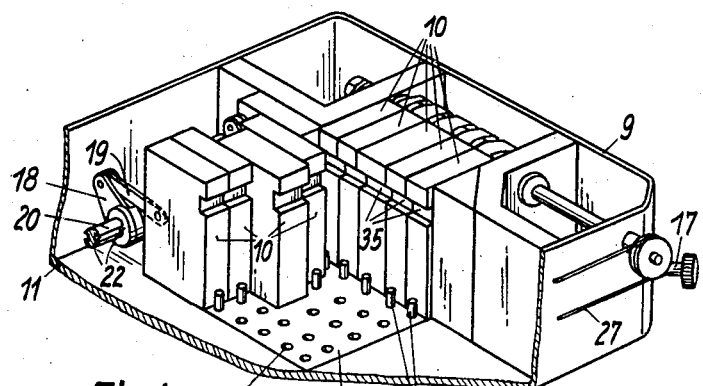
Figure 7:
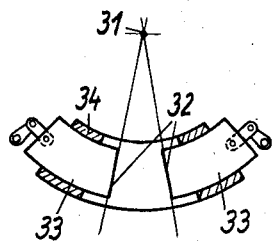
Figure 8:
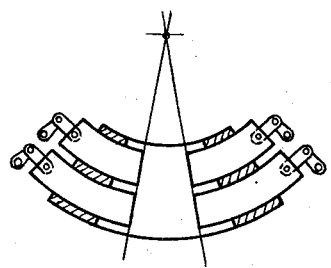
Figure 6:
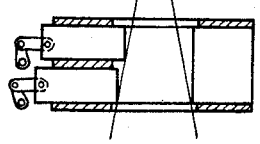

Fig. 6 indicates in schematic manner a plurality of collimator systems one disposed upon the other in the direction of the central ray beam;

Fig. 7 shows arcuate plates arranged in planes parallel to the central ray;

Fig. 8 indicates a plurality of collimator systems according to Fig. 7, arranged in superposed manner; and Fig. 9 indicates the use of a treatment cone in conjunction with a structure such as shown in Fig. 4.

Figure 1:
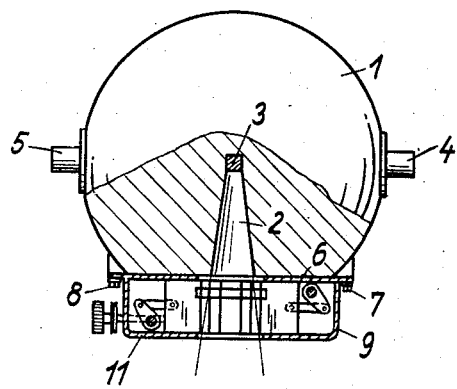

The radiation head, shown in Fig. 1, comprises a spherical shielding body 1, which is provided with a radial, conical or pyramidal shaped cutout 2 extending substantially to the center of the head, where the source 3, cobalt 60 for instance, is disposed. The radiation head may be rotatably mounted by means of diametrically disposed pivots 4, 5.

The shielding body 1 is provided with a plane surface 6 located on the lower side as shown in the drawing, to which is secured a collimator system 9 by means of the screws 7, 8.

Figures 2, 3:
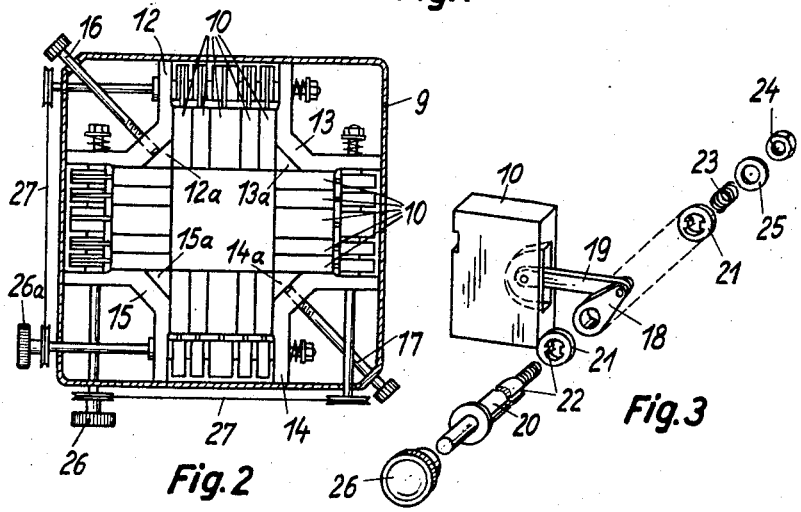
Figs. 2 to 4 show various views of the collimator system.

The collimator system 9 illustrated in Figs. 2 to 4 comprises a plurality of groups of collimator plates 10, extending upright in the direction of the central ray of the ray beam and in the respective groups side by side in planes parallel to the central ray of the ray beam the edges of the plates facing in directions perpendicular to the central ray. In the example shown, the plates are combined in two pairs of groups, each group having five plates. The base 11 of the casing of the collimator system serves to guide the plates. The groups of plates are confined in their positions by means of angle bars 12, 13, 14, 15 and prism-shaped blocks 12a, 13a, 14a and 15a, which may be adjusted manually with the screw-spindles 16, 17, thus making it possible to vary the contact pressure between the collimator plates.

As shown in Fig. 3, the adjusting means for the collimator plates comprises an adjusting crank 18 for each corresponding plate, with a push rod 19 articulated with the plate. All cranks 18 belonging to a group of plates are rotatably mounted on a common driving shaft 20. The rotation of the cranks 18 is effected with the aid of friction disks 21 carried by the shaft 20, by means of grooves and tongues, for example, and pressed against the cranks 18 by springs 23. The spring pressure may be varied by means of an adjustable nut 24 on the shaft 20 operating against a washer 25 which engages the spring. The shaft may be adjusted by means of knob or handwheel 26 which is fastened thereto. As will be seen from Fig. 2, the collimator plates of oppositely disposed groups are commonly adjustable. For this purpose, the two driving shafts which operate the corresponding groups of plates are coupled to each other by means of an endless belt 27 or the like. Fig. 2 shows the operating means 26 and 26a, each for adjusting two groups of oppositely disposed plates.

Figure 5:
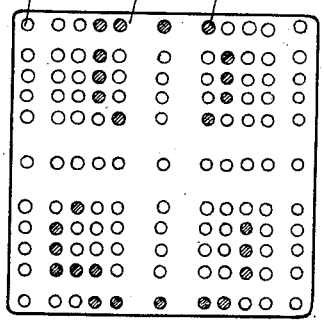
Fig. 5 illustrates a template for setting the field.

In order to set the field, a setting template 28 may be employed as illustrated in Fig. 5 (also shown in Fig. 4), which is provided with a number of bores 29, for receiving pins or similar stop means. Since the cranks 18 are rotatably mounted on the shaft 20 and are moved on account of the frictional forces between the cranks and the friction disks 21, the collimator plates may be brought into positions which are limited by the pins 30 of setting template 28. It is thus possible to set the shape and size of the field in steps corresponding with the number of plates contained in each group.

In the case of very high radiant energies it may be advantageous to arrange several collimator systems of this type, one above the other, in the direction of the central ray, as schematically outlined in Fig. 6. In such arrangement, the adjusting means for superposed groups of plates may be coupled analogously as described below. One setting pattern with adjustable stops may be provided for each collimator system, so that the setting of the field size and shape may again be effected as previously explained.

According to Fig. 7, arcuate collimator plates 33 arranged in planes parallel to the central ray and supported so that they may be swivelled about an axis 31, which preferably extends through the radiation source, the front edges 32 of the collimator plates 33, extending tangential to the ray beam and forming limiting surfaces therefor. Numeral 34 indicates curved guide tracks for the plates 33.

As shown in Fig. 8, two or more collimator systems, such as indicated in Fig. 7 may be superposed in the beam direction. The adjusting means may correspond to those previously described.

As illustrated in Fig. 4, the collimator plates can be provided with groove-shaped cutouts 35, into which, according to Fig. 9, a treatment cone 36 may be inserted, which is of advantage in order to reduce the penumbra zone of sources with larger focus areas.

The ray beam may be partially limited by fixed, upright bodies, for instance, bodies of U-shaped cross section, with a stack of collimator plates arranged in the interior space thereof to limit a portion of the ray beam according to shape and size. If two opposing stacks of collimator plates are utilized, they may be movably supported between fixed limiting bodies. Such and similar arrangements are within the scope of this invention. Moreover, it is possible to couple not only the driving elements for two oppositely disposed groups of plates, but those for any number of groups of plates, if necessary those for all groups of plates, and to operate them by a common actuating means.

What I claim is:

1. A device for collimating a ray beam emanating from a source of high energy, comprising a plurality of individually movable approximately rectangular collimation plates disposed side by side in upright positions with corresponding edges thereof extending in the direction of the ray beam to be collimated, said edges constituting the collimating edges, and a separate adjusting member for each of said collimator plates adapted to move its respective plate laterally in a direction perpendicular to the ray beam to adjust the collimating edge thereof with reference to said ray beam, a common driving element for said adjusting members, and friction clutch means for coupling each individual adjusting member with said driving element.

2. A device according to claim 1, comprising a rotatable drive shaft constituting said common driving element, said adjusting members being freely rotatable upon said common drive shaft, said friction clutch means being fixedly mounted on said drive shaft, one friction clutch means for each adjusting member and disposed adjacent thereto.

3. A device according to claim 2, comprising spring means disposed on said shaft for exerting pressure axially thereof to effect friction pressure engagement of said friction clutch means with the adjusting members which are respectively individual thereto.

4. A device according to claim 1, comprising setting means for adjustably setting the adjustment pattern of said collimator plates with respect to the ray beam, said setting means comprising a template having rows of holes formed therein for receiving stops to be placed in the lateral paths of adjustment motion of the respective collimator plates for the purpose of selectively setting said collimator plates in accordance with a desired size and shape of the radiation field of the ray beam.

5. A device for collimating a ray beam emanating from a source of high energy, comprising a plurality of groups of collimator plates disposed at right angle to one another, each group comprising a plurality of individually movable approximately rectangular plates disposed side by side in upright positions with corresponding inner edges thereof extending in the direction of the ray beam to be collimated, a separate adjusting member for each plate in each group and adapted to move its respective plate laterally inwardly in a direction perpendicular to the ray beam to set the inner edge thereof with reference to such ray beam, a common driving member for the adjusting members in each group of plates, friction clutch means for coupling each individual adjusting member with the common driving member therefor, and means for coupling at least two of said driving members for common driving operation.

6. A device according to claim 5, comprising setting means for adjustably setting the adjustment pattern of the inner edges of said collimator plates with respect to the ray beam, said setting means comprising a template having rows of holes formed therein for receiving stops to be placed in the lateral inward adjusting path of motion of the respective collimator plates for the purpose of selectively setting said plates in accordance with a desired size and shape of the radiation field of the ray beam.

References Cited in the file of this patent

UNITED STATES PATENTS

| | | |
|---|---|---|
| 1,709,626 | McGunnigle | Apr. 16, 1929 |
| 2,675,486 | Green et al. | Apr. 13, 1954 |

FOREIGN PATENTS

| | | |
|---|---|---|
| 192,300 | Germany | Dec. 6, 1906 |